(No Model.)

G. M. FORBES.
AXLE FOR VEHICLES.

No. 326,284. Patented Sept. 15, 1885.

WITNESSES:
Donn Twitchell
C. Sedgwick

INVENTOR:
G. M. Forbes
BY Munn & Co
ATTORNEYS.

UNITED STATES PATENT OFFICE.

GOVERNEUR M. FORBES, OF SALT LAKE CITY, UTAH TERRITORY.

AXLE FOR VEHICLES.

SPECIFICATION forming part of Letters Patent No. 326,284, dated September 15, 1885.

Application filed August 14, 1884. (No model.)

*To all whom it may concern:*

Be it known that I, GOVERNEUR M. FORBES, of Salt Lake City, in the county of Salt Lake and Territory of Utah, have invented a new and Improved Axle for Vehicles, of which the following is a full, clear, and exact description.

The object of my invention is to relieve the jolt or jar on vehicles caused by the wheels running over obstacles; and for that purpose it consists in a cranked axle, and also in cams for retaining the body level, or nearly so, as the crank turns over, all as hereinafter described and claimed.

Reference is to be had to the accompanying drawings, forming a part of this specification, in which similar letters of reference indicate corresponding parts in the figures.

Figure 1:
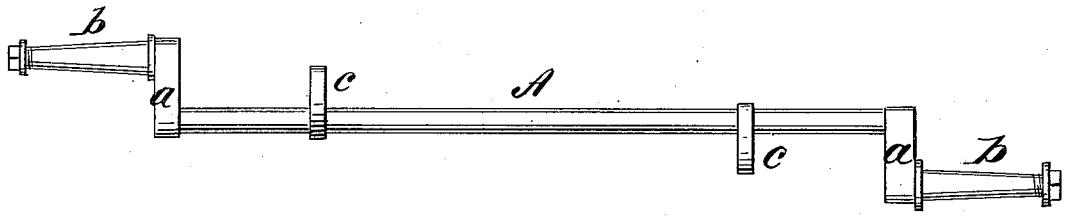
Figure 2:
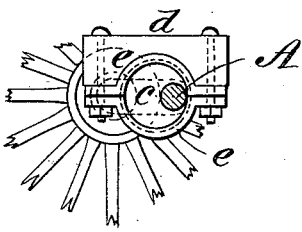

Figure 1 is a plan view of the crank-axle, and Fig. 2 is a cross-section showing the manner of attaching the axle.

The axle A has at its ends crank-arms $a$, placed at one hundred and eighty degrees apart, or nearly so, and on the outer ends of the arms $a$ the spindles or journals $b$ are formed or attached. On the axle, between the crank-arms, are cams or eccentrics $c$ $c$, also placed reversely. The axle is attached to bearing-blocks $d$, Fig. 2, by boxes $e$, which inclose the cams, so that they may turn in the boxes.

In case either wheel of the vehicle strikes an obstruction not larger than the crank-arms are long the wheel, rising, would cause the crank-arm to turn over, thereby revolving the axle, so that there would be little or no jar given to the body, as the other wheel would go down in relation to the body, thereby keeping the body approximately level. At the same time the cams $c$, acting to swing the axle, retain the wheels parallel with the direction of travel and in line with the hind wheels.

A vehicle provided with this axle travels much more easily and smoothly than one with a straight axle over ordinary roads, as the revolving motion of the wheels, in addition to their rotary motion, aids them in passing the obstacles without jar by compensating the rise.

Having thus described my invention, I claim as new and desire to secure by Letters Patent—

1. The axle A for vehicles, provided with crank-arms at its ends and cams $c$, the arms carrying spindles for the wheels, substantially as described.

2. The combination, with a cranked axle on a vehicle, of cams $c$ and boxes $d$, substantially as and for the purpose specified.

GOVERNEUR M. FORBES.

Witnesses:
LOUIS J. RUTH,
J. J. THOMAS.